(12) United States Patent
Chen et al.

(10) Patent No.: US 11,570,715 B2
(45) Date of Patent: Jan. 31, 2023

(54) POWER SAVING WITH LATENCY CONTROL MECHANISM OF ELECTRONIC DEVICE

(71) Applicant: MEDIATEK INC., Hsin-Chu (TW)

(72) Inventors: Chun-Yi Chen, Hsinchu (TW); Tsung-Chieh Huang, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 17 days.

(21) Appl. No.: 17/143,118

(22) Filed: Jan. 6, 2021

(65) Prior Publication Data

US 2022/0078713 A1    Mar. 10, 2022

Related U.S. Application Data

(60) Provisional application No. 63/087,363, filed on Oct. 5, 2020, provisional application No. 63/075,241, filed on Sep. 7, 2020.

(51) Int. Cl.
*H04W 52/02* (2009.01)

(52) U.S. Cl.
CPC ............... *H04W 52/0235* (2013.01)

(58) Field of Classification Search
CPC .................................. H04W 52/0235
See application file for complete search history.

(56) References Cited

U.S. PATENT DOCUMENTS

| 2007/0147330 A1* | 6/2007 | Smith | H04W 52/0229 370/346 |
| 2016/0143085 A1 | 5/2016 | Cai | |
| 2018/0184445 A1* | 6/2018 | Larmo | H04W 52/0216 |

FOREIGN PATENT DOCUMENTS

| EP | 3 177 079 A1 | 6/2017 |
| WO | 2006/138326 A1 | 12/2006 |
| WO | 2019/125425 A1 | 6/2019 |

* cited by examiner

*Primary Examiner* — James P Duffy
(74) *Attorney, Agent, or Firm* — Winston Hsu

(57) ABSTRACT

The present invention provides a wireless communication method of an electronic device, wherein the wireless communication method includes the steps of: receiving a first beacon with TIM comprising an AID of the electronic device; in response to the first beacon with TIM, controlling the electronic device to switch to an active mode from a power saving mode to receive a first packet, wherein a time length of the active mode is less than a beacon period; receiving a second beacon with no TIM, wherein the second beacon with no TIM does not comprise the AID of the electronic device; and in response to the second beacon with no TIM, controlling the electronic device to switch to the active mode from the power saving mode.

15 Claims, 4 Drawing Sheets

POWER SAVING WITH LATENCY CONTROL MECHANISM OF ELECTRONIC DEVICE

CROSS REFERENCE TO RELATED APPLICATIONS

This application claims the priority of U.S. Provisional Application No. 63/075,241 (filed on Sep. 7, 2020) and U.S. Provisional Application No. 63/087,363 (filed on Oct. 5, 2020), which is included herein by reference in its entirety.

BACKGROUND

IEEE 802.11 standards define a power saving mode (sleep mode) for a station to save power, and IEEE 802.11 standards further use a bitmap to indicate to any sleeping station that an access point (AP) has buffered data waiting for it. Specifically, if the AP needs to send data to a station, the AP will buffer the data first, and the AP notifies the station by using a next beacon with traffic indication map (TIM). The station should periodically listen to the beacon during the listen interval, and once the station receives the beacon with TIM, the station leaves the power saving mode and enters an active mode to receive the data from the AP. In one case, after the station leaves the power saving mode to receive the data, if the station enters the power saving mode immediately after the data reception, upcoming data will be buffered in the AP. That is, the data will not be received by the station until the next beacon with TIM is received, causing high data latency.

In order to reduce the data latency, the station may be designed to stay in the active mode for a long time such as 200 milliseconds. If data is coming during this period, the station can immediately receive the data without delay. However, if no data is coming during this period, the station will have unnecessary power consumption.

SUMMARY

It is therefore an objective of the present invention to provide a power saving and latency control mechanism of the station, which can set a time to leave the power saving mode (i.e., a time of the active mode) according to the received packets, not limited to the beacon with TIM, to solve the above-mentioned problems.

According to one embodiment of the present invention, a wireless communication method of an electronic device comprises the steps of: receiving a first beacon with TIM comprising an association identity (AID) of the electronic device; in response to the first beacon with TIM, controlling the electronic device to switch to an active mode from a power saving mode to receive a first packet, wherein a time length of the active mode is less than a beacon period; receiving a second beacon with no TIM, wherein the second beacon with no TIM does not comprise the AID of the electronic device; and in response to the second beacon with no TIM, controlling the electronic device to switch to the active mode from the power saving mode.

According to another embodiment of the present invention, a wireless communication method of an electronic device comprises the steps of: receiving at least one packet; and in response to the at least one packet, controlling the electronic device to switch to an active mode from a power saving mode, and controlling the active mode to have different time length according to the at least one packet.

According to another embodiment of the present invention, an electronic device is configured to perform steps of: receiving a first beacon with TIM comprising an AID of the electronic device; in response to the first beacon with TIM, controlling the electronic device to switch to an active mode from a power saving mode to receive a first packet, wherein a time length of the active mode is less than a beacon period; receiving a second beacon with no TIM, wherein the second beacon with no TIM does not comprise the AID of the electronic device; and in response to the second beacon with no TIM, controlling the electronic device to switch to the active mode from the power saving mode.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
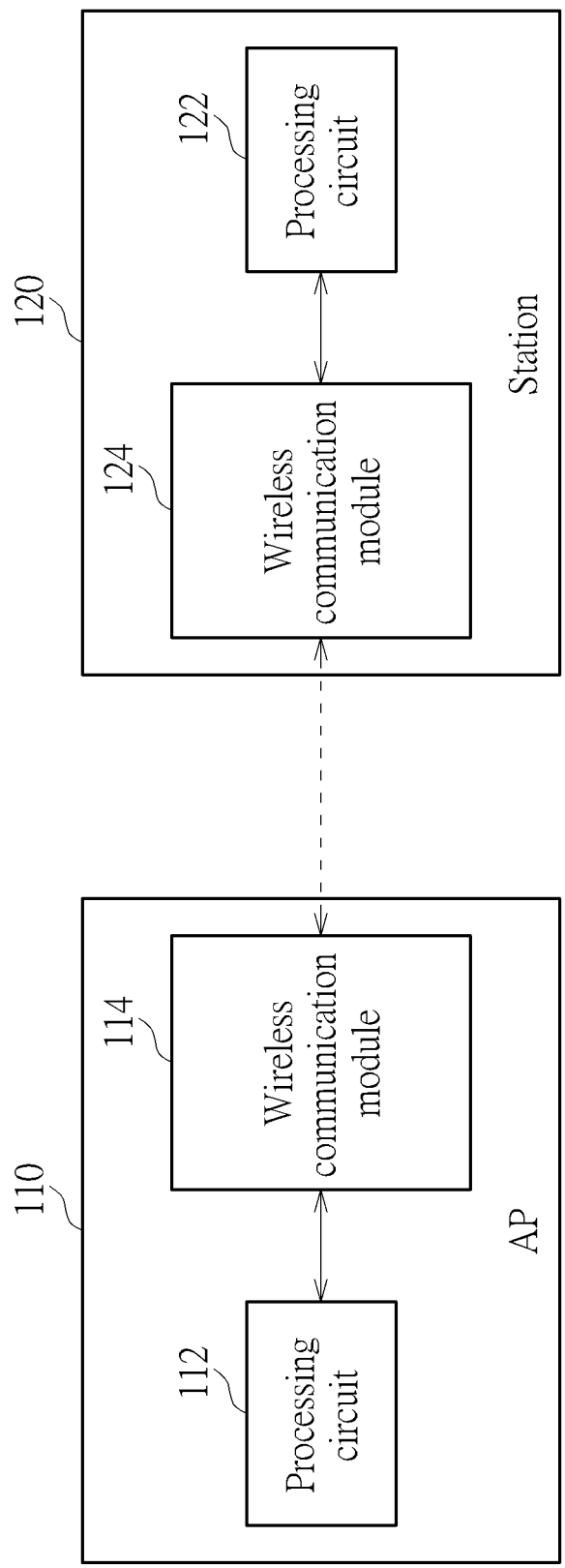
FIG. 1 is a diagram illustrating a wireless communication system according to one embodiment of the present invention.

FIG. 1 is a diagram illustrating a wireless communication system according to one embodiment of the present invention. As shown in FIG. 1, the wireless communication system comprises an access point (AP) 110 and at least one station (FIG. 1 shows one station 120). The AP 110 is a Wi-Fi access point that allows other wireless devices such as the station 120 to connect to a wired network, and the AP 110 mainly comprises a processing circuit 112 and a wireless communication module 114. The station 120 is a Wi-Fi station comprising a processing circuit 122 and a wireless communication module 124, and the station 120 can be a cell phone, a tablet, a notebook, or any other electronic device capable of wirelessly communicating with the AP 110.

In the operation of the AP 110 and the station 120, the station 120 can operate in a power saving mode (i.e., sleep mode) or an active mode, wherein the power saving mode is for reducing power consumption (i.e., the station 120 cannot receive data packet from the AP 110), and the active mode is for communicating with the AP 110. In addition, when the station 120 operates in the power saving mode, the AP 110 still periodically generates beacons to the station 120, and the station 120 will periodically receive the beacons during the listen interval to determine if switching to the active mode. In this embodiment, the station 120 can dynamically set the time length of the active mode according to the received packets. That is, the station 120 can refer to information within the packets (e.g., beacons) to determine if switching to the active mode from the power saving mode, and the station 120 further refers to the information within the packets to determine the time length of the active mode if it is determined to switch to the active mode. By using the above control mechanism, the station 120 can have better power saving efficiency and signal latency control.

Figure 2:
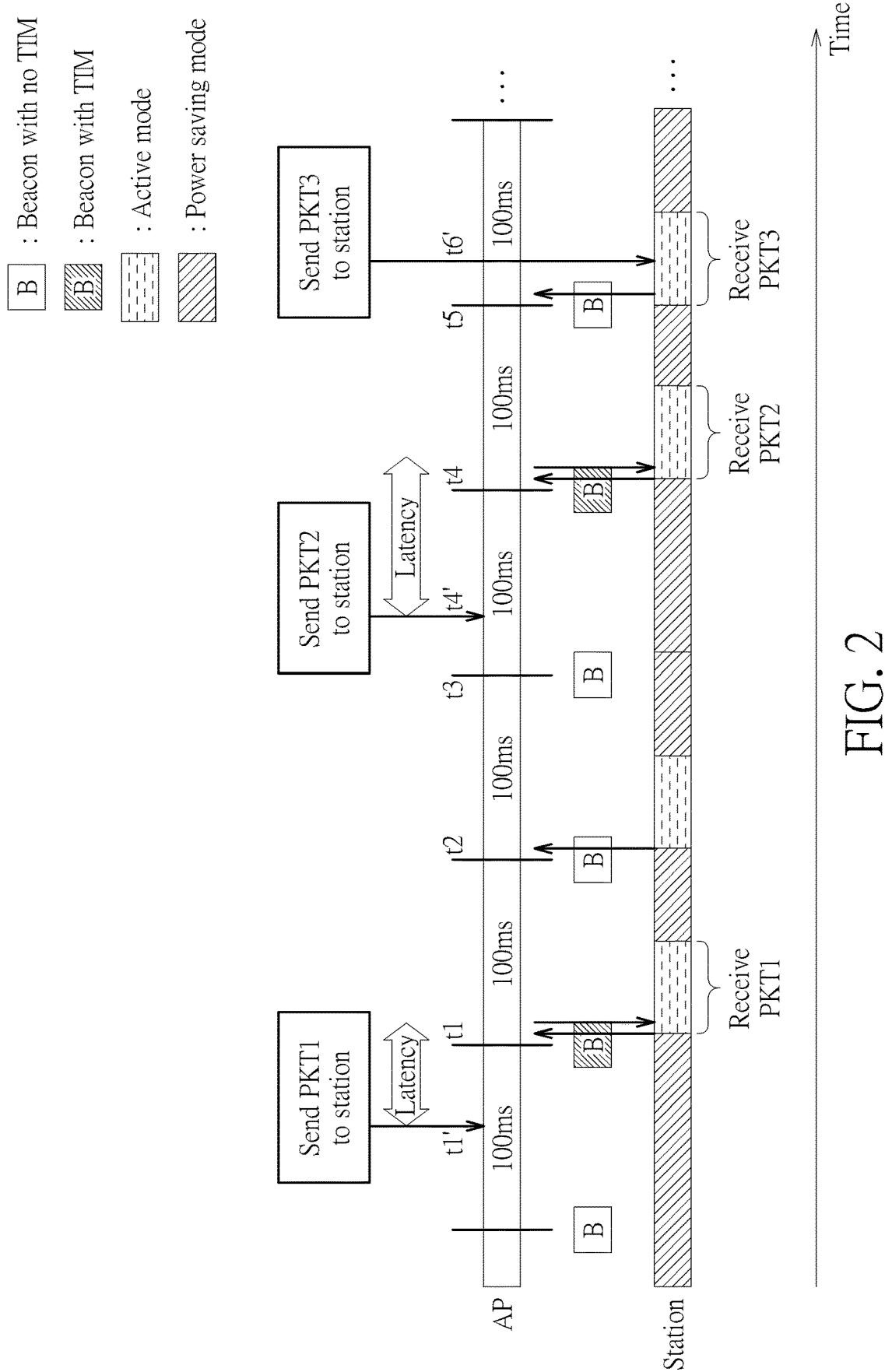
FIG. 2 shows a timing diagram of the AP and the station according to one embodiment of the present invention.

Specifically, refer to FIG. 2 that shows a timing diagram of the AP 110 and the station 120 according to one embodiment of the present invention. As shown in FIG. 2, initially the station 120 operates in the power saving mode, and the AP 110 periodically broadcasts the beacons, wherein the period of the beacons can be any appropriate time such as 100 milliseconds (ms). At time t1', the AP 110 needs to send a packet PKT1 to the station 120, however, because the station 120 is in the power saving mode that is not allowed to receive the packets, the AP 110 temporarily buffers the packet PKT1 in an internal buffer of the processing circuit 112 or in an internal buffer of the wireless communication module 114. At time t1, the AP 110 broadcasts the beacon with TIM, wherein the TIM comprises an association identity (AID) of the station 120. That is, the TIM is used to notify that the AP 110 buffers data that is to be sent to the station 120. After receiving the beacon with TIM, the station 120 leaves the power saving mode and enters the active mode to receive the packet PKT1 from the AP 110. In this embodiment, the time length of the active mode is set to be shorter to save power, for example, if the period of the beacons is 100 ms, the time length of the active mode may be 50 ms-70 ms that is shorter than the period of the beacons. In addition, the station 120 will send null frames to notify the AP 110 about an interval of the active mode. The null frame is a control frame that is only transmitted by the station 120, and the purpose of the null frame is to carry a power management bit, wherein the power management bit will be either "0" or "1". When the station 120 starts to operate in the active mode, the station 120 sends the null frame including the power management bit of "0" to the AP 110 to inform the AP 110 that the station 120 is in the active mode and transmission of frames from AP 110 to station 120 should be normal; and when the station 120 wants to enter the power saving mode, the station 120 sends the null frame including the power management bit of "1" to the AP 110 to inform the AP 110 that the station 120 is in the power saving mode and the transmission of frames from AP 110 to station 120 is not allowed.

At time t2, because the AP 110 does not buffer the data for the station 120, the AP 110 sends the beacon with no TIM to the station 120, that is the AP 110 informs the station 120 that no packet will be transmitted. After receiving the beacon with no TIM from the AP 110, the station 120 can still switch to the active mode from the power saving mode so that the station 120 can receive packets suddenly transmitted from the AP 110, if any. In this embodiment, because the AP 110 may send packets densely, the station 120 may refer to the received packets (e.g., including the previous packet (PKT1 and beacon with TIM)) to determine if switching to the active mode. In FIG. 2, because the packet PKT1 is received between t1 and t2, the station 120 can operate in the active mode even if the beacon with no TIM is received. In addition, the time length of the active mode is set to be shorter than the period of the beacons, and the null frames are sent to notify the AP 110 about the interval of the active mode.

At time t3, because the AP 110 does not buffer the data for the station 120, the AP 110 sends the beacon with no TIM to the station 120. At this time, the station 120 may not enter the active mode.

At time t4', the AP 110 needs to send a packet PKT2 to the station 120, however, because the station 120 is in the power saving mode that is not allowed to receive the packets, the AP 110 temporarily buffers the packet PKT2 in the internal buffer. At time t4, the AP 110 broadcasts the beacon with TIM, wherein the TIM comprises the AID of the station 120. After receiving the beacon with TIM, the station 120 leaves the power saving mode and enters the active mode to receive the packet PKT2 from the AP 110. In this embodiment, the time length of the active mode is set to be shorter to save power, for example, the time length of the active mode may be 50 ms-70 ms that is shorter than the period of the beacons. In addition, the station 120 will send null frames to notify the AP 110 about an interval of the active mode.

At time t5, because the AP 110 does not buffer the data for the station 120, the AP 110 sends the beacon with no TIM to the station 120. After receiving the beacon with no TIM from the AP 110, the station 120 still switches to the active mode from the power saving mode so that the station 120 can receive packets suddenly transmitted from the AP 110, wherein the null frames are sent to the station 120 to inform the interval of the active mode. At time t6', the AP 110 needs to send a packet PKT3 to the station 120. Because the station 120 still operates in the active mode at the time t6', the AP 110 can immediately send the packet PKT3 to the station 120 with no data latency.

In the embodiment shown in FIG. 2, the station 120 may not always enter the active mode when the beacon with no TIM is received (e.g., t3-t4). In another embodiment, however, the station 120 can be designed to always enter the active mode when the beacon with no TIM is received. This alternative design shall fall within the scope of the present invention.

In the embodiment shown in FIG. 2, the station 120 enters the active mode after receiving the beacon with TIM or the beacon with no TIM. In another embodiment, because the station 120 knows the beacon period, the station 120 may switch to the active mode from the power saving mode before the beacon is received. Taking the time t2 as an example, the station may switch to the active mode 10 ms before the time t2. In other words, as long as the station 120 switches to the active mode from the power saving mode in response to the beacon with no TIM, regardless of whether the switching operation is before or after receiving the beacon, this alternative design shall fall within the scope of the present invention.

In the embodiment shown in FIG. 2, by setting a shorter active mode after receiving the beacon with TIM, the station 120 can reduce the power consumption. Furthermore, by referring to the received packets (not limited to the beacon with TIM) to control the station 120 to switch to the active mode from the power saving mode, the station 120 can receive packets suddenly transmitted from the AP 110 (e.g., packet PKT3 shown in FIG. 2) to improve data latency. In addition, the latency of the station 120 is controllable. Taking t1-t2 as an example, if the time length of active mode is set to be 70 ms within t1-t2, the latency can be controlled to less than 30 ms.

Figure 3:
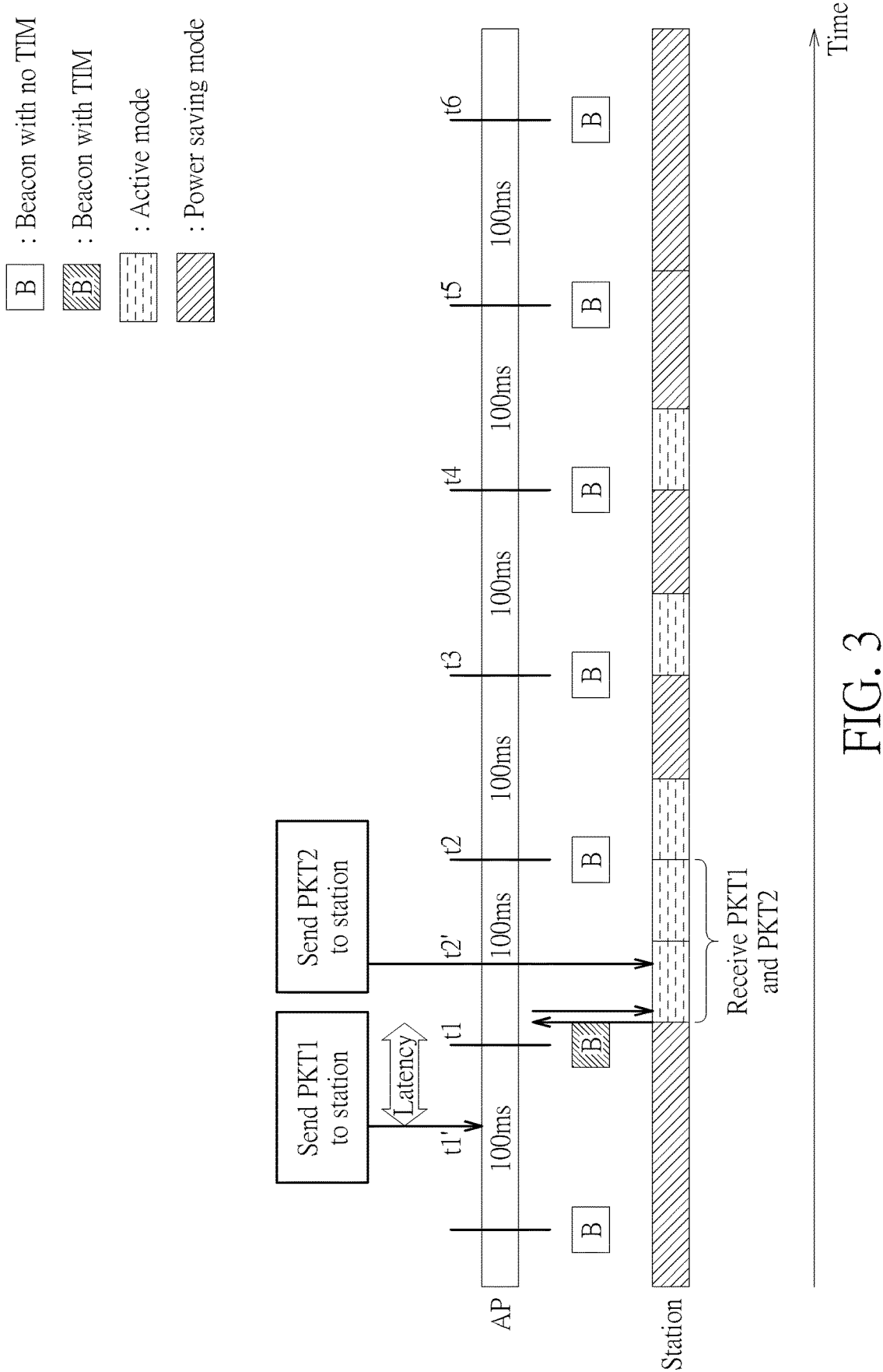
FIG. 3 shows a timing diagram of the AP and the station according to another embodiment of the present invention.

FIG. 3 shows a timing diagram of the AP 110 and the station 120 according to another embodiment of the present invention. As shown in FIG. 3, initially the station 120 operates in the power saving mode, and the AP 110 periodically broadcasts the beacons, wherein the period of the beacons can be any appropriate time such as 100 ms. At time t1', the AP 110 needs to send a packet PKT1 to the station 120. However, because the station 120 is in the power saving mode that is not allowed to receive the packets, the AP 110 temporarily buffers the packet PKT1 in an internal buffer. At time t1, the AP 110 broadcasts the beacon with TIM, wherein the TIM comprises an AID of the station 120. That is, the TIM is used to notify that the AP 110 buffers data that is to be sent to the station 120. After receiving the beacon with TIM, the station 120 leaves the power saving mode and enters the active mode to receive the packet PKT1 from the AP 110. In this embodiment, the time length of the active mode is set to be shorter to save power. For example, if the period of the beacons is 100 ms, the time length of the active mode may be 50 ms-70 ms that is shorter than the period of the beacons. In addition, when the station 120 starts to operate in the active mode, the station 120 sends the null frame including the power management bit of "0" to the AP 110 to inform the AP 110 that the station 120 is in the active mode and transmission of frames from AP 110 to station 120 should be normal.

At time t2', the AP 110 needs to send a packet PKT2 to the station 120. Because the station 120 still operates in the active mode at the time t2', the AP 110 can immediately send the packet PKT2 to the station 120 with no data latency. In addition, because of the transmission of the packet PKT2, the station 120 can extend the time length of the active mode to make sure that the packet PKT2 is received successfully.

At time t2, because the AP 110 does not buffer the data for the station 120, the AP 110 sends the beacon with no TIM to the station 120. After receiving the beacon with no TIM from the AP 110, the station 120 still operates in the active mode so that the station 120 can receive packets suddenly transmitted from the AP 110. After a period of time from the time t2, the station 120 can send a null frame including the power management bit of "1" to the AP 110 to inform the AP 110 that the station 120 will enter the power saving mode.

Similarly, at time t3 and time t4, the station 120 can switch to the active mode from the power saving mode so that the station 120 can receive packets suddenly transmitted from the AP 110, if any, wherein the null frames are sent to the AP 110 to inform the interval of the active mode.

At time t5, because there is no data packet from the AP 120 during several beacon periods, the station 120 will not enter the active mode when receiving the beacon with no TIM.

In the embodiment shown in FIG. 3, the station 120 may not always enter the active mode when the beacon with no TIM is received (e.g., t5-t6). In another embodiment, however, the station 120 can be designed to always enter the active mode when the beacon with no TIM is received. This alternative design shall fall within the scope of the present invention.

In the embodiment shown in FIG. 3, the station 120 enters the active mode after receiving the beacon with TIM or the beacon with no TIM. In another embodiment, because the station 120 knows the beacon period, the station 120 may switch to the active mode from the power saving mode before the beacon is received. Taking the time t3 as an example, the station may switch to the active mode 10 ms before the time t3. In other words, as long as the station 120 switches to the active mode from the power saving mode in response to the beacon with no TIM, no matter if the switching operation is before or after receiving the beacon, this alternative design shall fall within the scope of the present invention.

In the embodiment shown in FIG. 3, the shorter active mode set by the station 120 can be extended while receiving other packet(s), and the extended active mode is more appropriate to the packet reception. In addition, by referring to the received packets (not limited to the beacon with TIM) to control the station 120 to switch to the active mode from the power saving mode, the station 120 can receive packets suddenly transmitted from the AP 110 to improve data latency.

Figure 4:
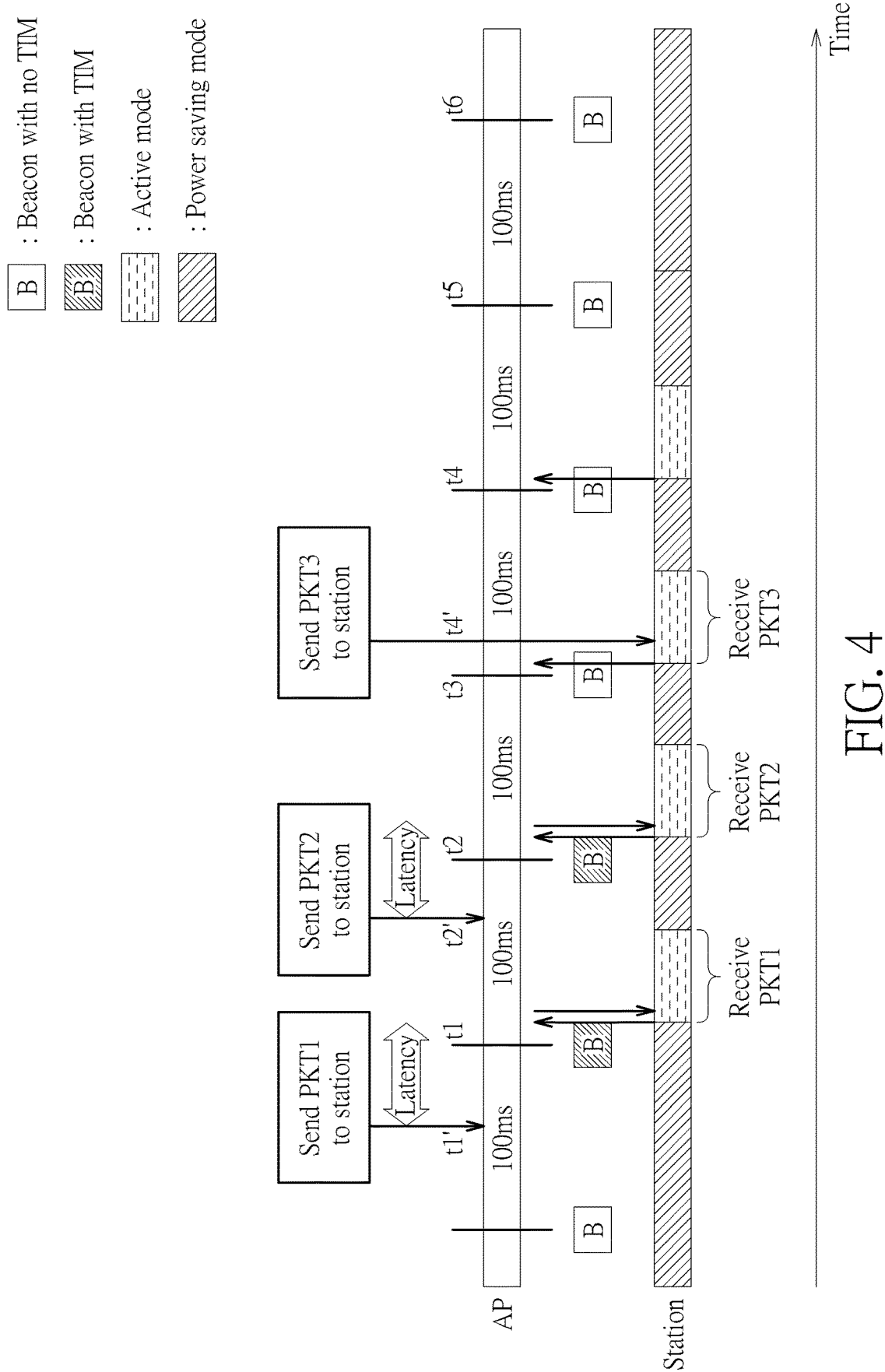
FIG. 4 shows a timing diagram of the AP and the station according to another embodiment of the present invention.

FIG. 4 shows a timing diagram of the AP 110 and the station 120 according to another embodiment of the present invention. As shown in FIG. 4, initially the station 120 operates in the power saving mode, and the AP 110 periodically broadcasts the beacons, wherein the period of the beacons can be any appropriate time such as 100 ms. At time t1', the AP 110 needs to send a packet PKT1 to the station 120 However, because the station 120 is in the power saving mode that is not allowed to receive the packets, the AP 110 temporarily buffers the packet PKT1 in an internal buffer. At time t1, the AP 110 broadcasts the beacon with TIM, wherein the TIM comprises an AID of the station 120. That is, the TIM is used to notify that the AP 110 buffers data that is to be sent to the station 120. After receiving the beacon with TIM, the station 120 leaves the power saving mode and enters the active mode to receive the packet PKT1 from the AP 110. In this embodiment, the time length of the active mode is set to be shorter to save power. For example, if the period of the beacons is 100 ms, the time length of the active mode may be 50 ms-70 ms that is shorter than the period of the beacons. In addition, when the station 120 starts to operate in the active mode, the station 120 sends the null frame including the power management bit of "0" to the AP 110 to inform the AP 110 that the station 120 is in the active mode and transmission of frames from AP 110 to station 120 should be normal; and when the station 120 wants to enter the power saving mode, the station 120 sends the null frame including the power management bit of "1" to the AP 110 to inform the AP 110 that the station 120 is in the power saving mode and the transmission of frames from AP 110 to station 120 is not allowed At time t2', the station 120 has entered the power saving mode, and the AP 110 needs to send a packet PKT2 to the station 120. At this time, because the station 120 is in the power saving mode that is not allowed to receive the packets, the AP 110 temporarily buffers the packet PKT2 in an internal buffer. At time t2, the AP 110 broadcasts the beacon with TIM, wherein the TIM comprises an AID of the station 120. After receiving the beacon with TIM, the station 120 leaves the power saving mode and enters the active mode to receive the packet PKT2 from the AP 110. In this embodiment, the time length of the active mode is set to be shorter to save power, for example, 50 ms-70 ms. In addition, the station 120 sends the null frames to the AP 110 to notify the interval of the active mode.

At time t3, because the AP 110 does not buffer the data for the station 120, the AP 110 sends the beacon with no TIM to the station 120. After receiving the beacon with no TIM from the AP 110, the station 120 still switches to the active mode from the power saving mode so that the station 120 can receive packets suddenly transmitted from the AP 110, wherein the null frames are sent to the station 120 to inform the interval of the active mode. At time t4', the AP 110 needs to send a packet PKT3 to the station 120. Because the station 120 still operates in the active mode at the time t4', the AP 110 can immediately send the packet PKT3 to the station 120 with no data latency.

Similarly, at time t4, the station 120 can switch to the active mode from the power saving mode so that the station 120 can receive packets suddenly transmitted from the AP 110, if any, wherein the null frames are sent to the AP 110 to inform the interval of the active mode.

At time t5, because there is no data packet from the AP 120 during several beacon periods, the station 120 will not enter the active mode when receiving the beacon with no TIM.

In the embodiment shown in FIG. 4, the station 120 may not always enter the active mode when the beacon with no TIM is received (e.g., t5-t6). In another embodiment, however, the station 120 can be designed to always enter the active mode when the beacon with no TIM is received. This alternative design shall fall within the scope of the present invention.

In the embodiment shown in FIG. 4, the station 120 enters the active mode after receiving the beacon with TIM or the beacon with no TIM. In another embodiment, because the station 120 knows the beacon period, the station 120 may switch to the active mode from the power saving mode before the beacon is received. Taking the time t3 as an example, the station may switch to the active mode 10 ms before the time t3. In other words, as long as the station 120 switches to the active mode from the power saving mode in response to the beacon with no TIM, no matter if the switching operation is before or after receiving the beacon, this alternative design shall fall within the scope of the present invention.

In the embodiment shown in FIG. 4, by setting a shorter active mode after receiving the beacon with TIM, the station 120 can reduce the power consumption. Furthermore, by referring to the received packets (not limited to the beacon with TIM) to control the station 120 to switch to the active mode from the power saving mode, the station 120 can receive packets suddenly transmitted from the AP 110 (e.g., packet PKT3 shown in FIG. 4) to improve data latency. In addition, the latency of the station 120 is controllable, taking the packet PKT2 as an example, if the time length of active mode is set to be 70 ms within t1-t2, the latency of the packet PKT2 can be controlled to less than 30 ms.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless communication method of an electronic device, comprising:
 receiving a first beacon with traffic indication map (TIM) comprising an association identity (AID) of the electronic device;
 in response to the first beacon with TIM, controlling the electronic device to switch to an active mode from a power saving mode to receive a first packet, wherein a time length of the active mode is less than a beacon period;
 receiving a second beacon with no TIM, wherein the second beacon with no TIM does not comprise the AID of the electronic device; and
 in response to the second beacon with no TIM, controlling the electronic device to switch to the active mode from the power saving mode.

2. The wireless communication method of claim 1, wherein the second beacon with no TIM is a next beacon of the first beacon with TIM.

3. The wireless communication method of claim 1, wherein the step of controlling the electronic device to switch to the active mode from the power saving mode in response to the second beacon with no TIM comprising:
 in response to the second beacon with no TIM:
 when the electronic device is controlled to enter the active mode, sending a null frame including a power management bit to notify that the electronic device enters the active mode; and
 when the electronic device is controlled to enter the power saving mode, sending another null frame including the power management bit to notify that the electronic device enters the power saving mode.

4. The wireless communication method of claim 3, wherein a time length of the active mode set according to the second beacon with no TIM is less than the beacon period.

5. The wireless communication method of claim 1, further comprising:
 if only the first packet is received during the active mode set according to the first beacon with TIM, controlling the electronic device to switch to the power saving mode from the active mode after receiving the first packet;
 if a second packet is also received during the active mode set according to the first beacon with TIM, extending the time length of the active mode.

6. The wireless communication method of claim 1, further comprising:
 receiving a third beacon with no TIM, wherein the third beacon with no TIM does not comprise the AID of the electronic device;
 in response to the third beacon with no TIM, controlling the electronic device to stay in the power saving mode, without switching to the active mode.

7. The wireless communication method of claim 6, wherein a time when the third beacon with no TIM is received is later than a time when the second beacon with no TIM is received.

8. The wireless communication method of claim 7, wherein during a period between the reception of the second beacon with no TIM and the third beacon with no TIM, no data packet is received.

9. A wireless communication method of an electronic device, comprising:
 receiving a first beacon with no TIM, wherein the first beacon with no TIM does not comprise an association identity (AID) of the electronic device;
 in response to the first beacon with no TIM, controlling the electronic device to switch to the active mode from the power saving mode, and setting the active mode to have the first time length;
 receiving a second beacon with no TIM, wherein the second beacon with no TIM does not comprise the AID of the electronic device; and
 in response to the second beacon with no TIM, controlling the electronic device to switch to the active mode from the power saving mode, and setting the active mode to have the second time length
 receiving a third beacon with no TIM, wherein the third beacon with no TIM does not comprise the AID of the electronic device;
 in response to the third beacon with no TIM, controlling the electronic device to stay in the power saving mode, without switching to the active mode.

10. The wireless communication method of claim 9, wherein a time when the third beacon with no TIM is received is later than a time when the second beacon with no TIM is received.

11. The wireless communication method of claim 10, wherein during a period between the reception of the second beacon with no TIM and the third beacon with no TIM, no data packet is received.

12. An electronic device, configured to perform steps of:
   receiving a first beacon with traffic indication map (TIM) comprising an association identity (AID) of the electronic device;
   in response to the first beacon with TIM, controlling the electronic device to switch to an active mode from a power saving mode to receive a first packet, wherein a time length of the active mode is less than a beacon period;
   receiving a second beacon with no TIM, wherein the second beacon with no TIM does not comprise the AID of the electronic device; and
   in response to the second beacon with no TIM, controlling the electronic device to switch to the active mode from the power saving mode.

13. The electronic device of claim 12, wherein the second beacon with no TIM is a next beacon of the first beacon with TIM.

14. The electronic device of claim 12, wherein the step of controlling the electronic device to switch to the active mode from the power saving mode in response to the second beacon with no TIM comprising:
   in response to the second beacon with no TIM:
   when the electronic device is controlled to enter the active mode, sending a null frame including a power management bit to notify that the electronic device enters the active mode; and
   when the electronic device is controlled to enter the power saving mode, sending another null frame including the power management bit to notify that the electronic device enters the power saving mode.

15. The electronic device of claim 14, wherein a time length of the active mode set according to the second beacon with no TIM is less than the beacon period.

\* \* \* \* \*